C. GILBERT & E. J. ORNOLD.
RECTIFIER FOR ALTERNATING ELECTRIC CURRENTS.
APPLICATION FILED JAN. 14, 1916.
1,239,588.
Patented Sept. 11, 1917.
4 SHEETS—SHEET 1.
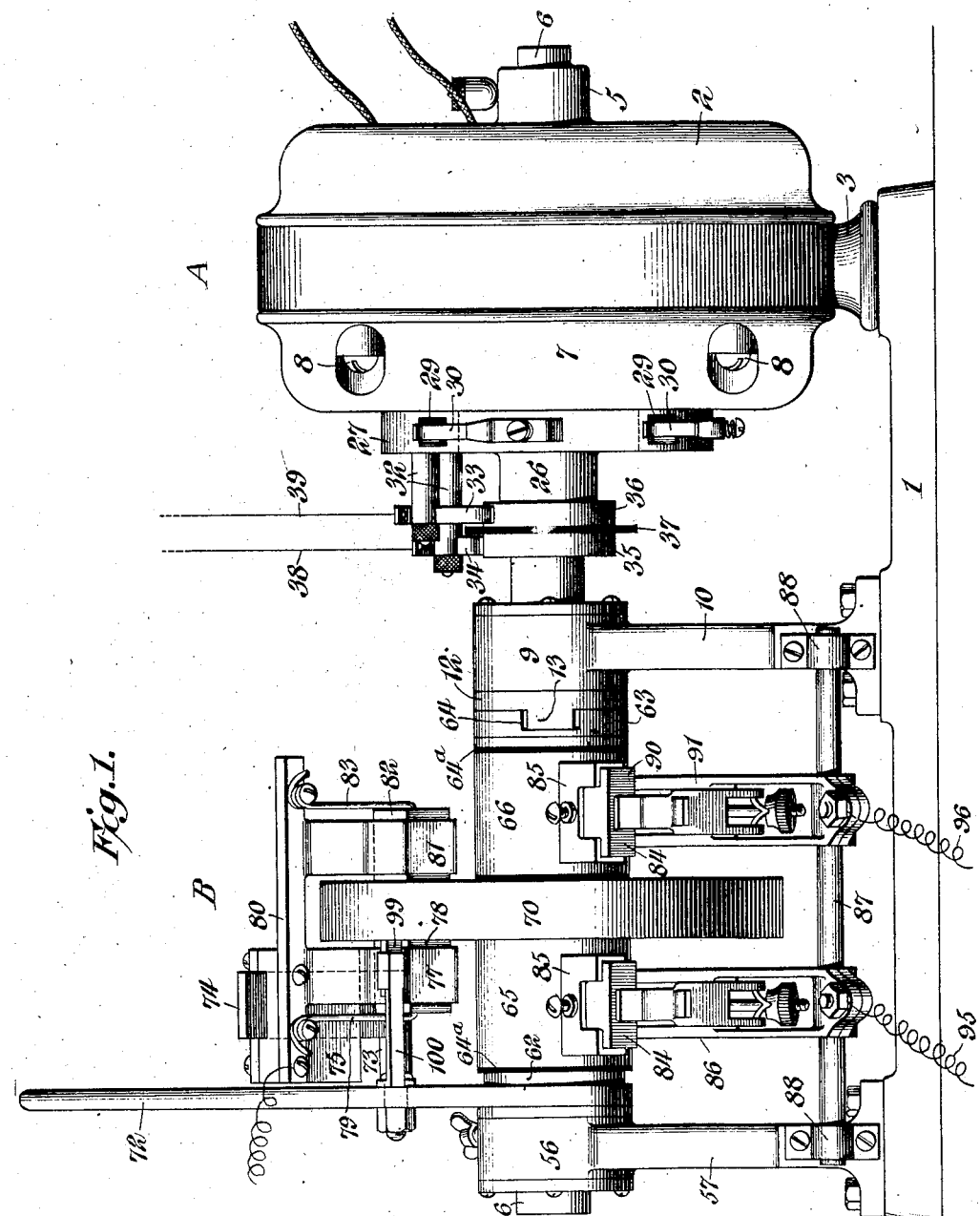
WITNESSES:
Howard D. Orr.
F. T. Chapman.
Clark Gilbert
and Edwin J. Ornold, INVENTORS,
BY
Attorney

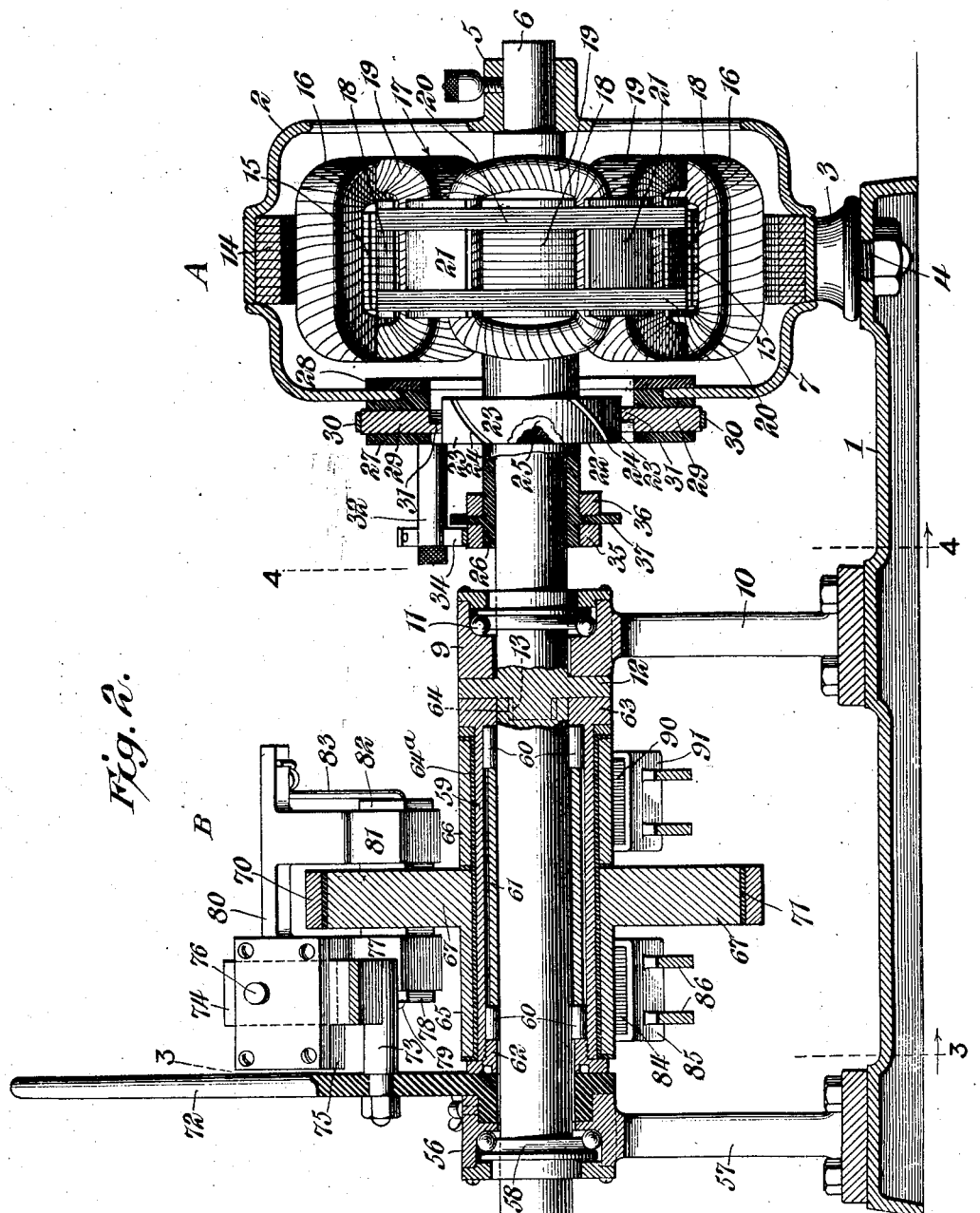

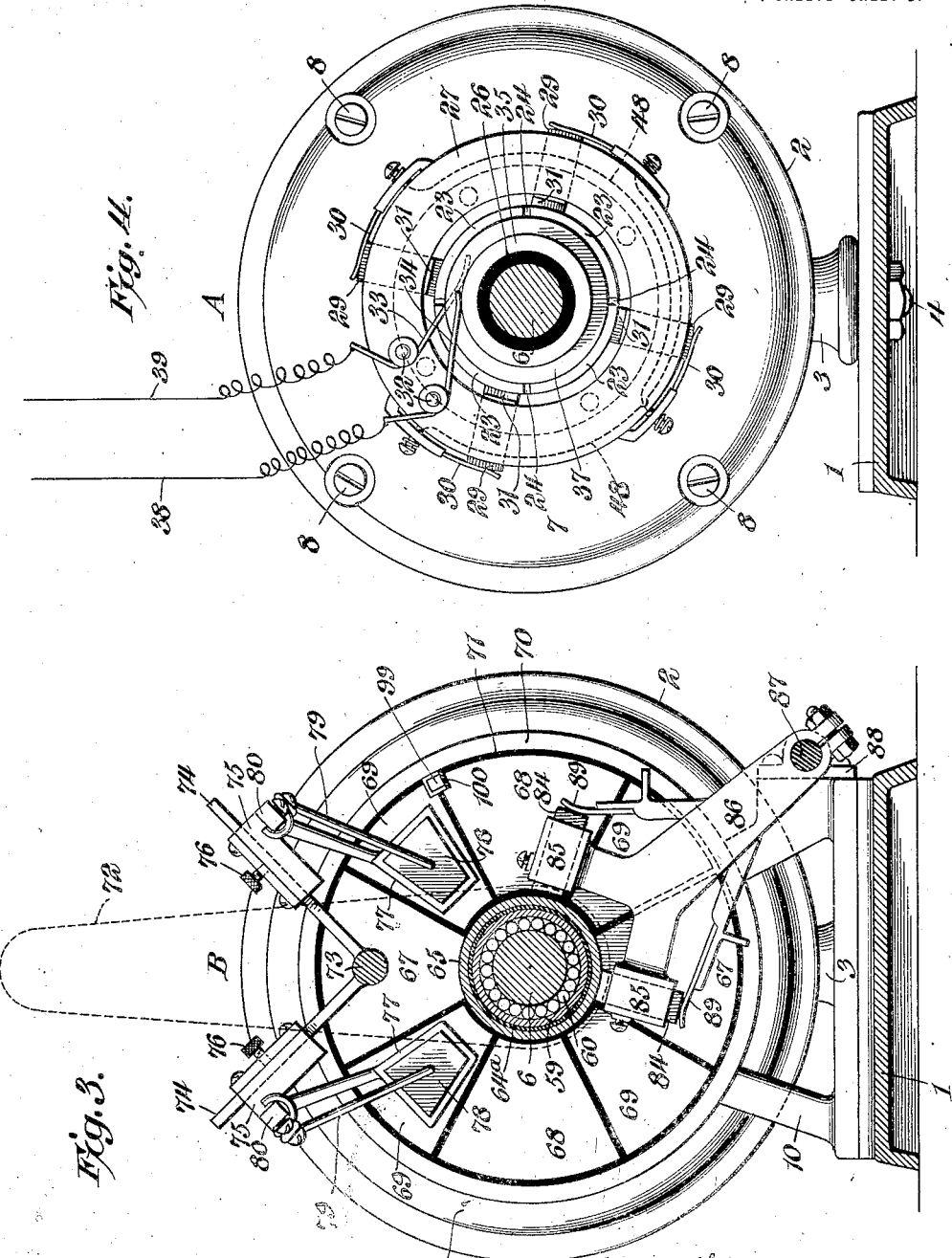

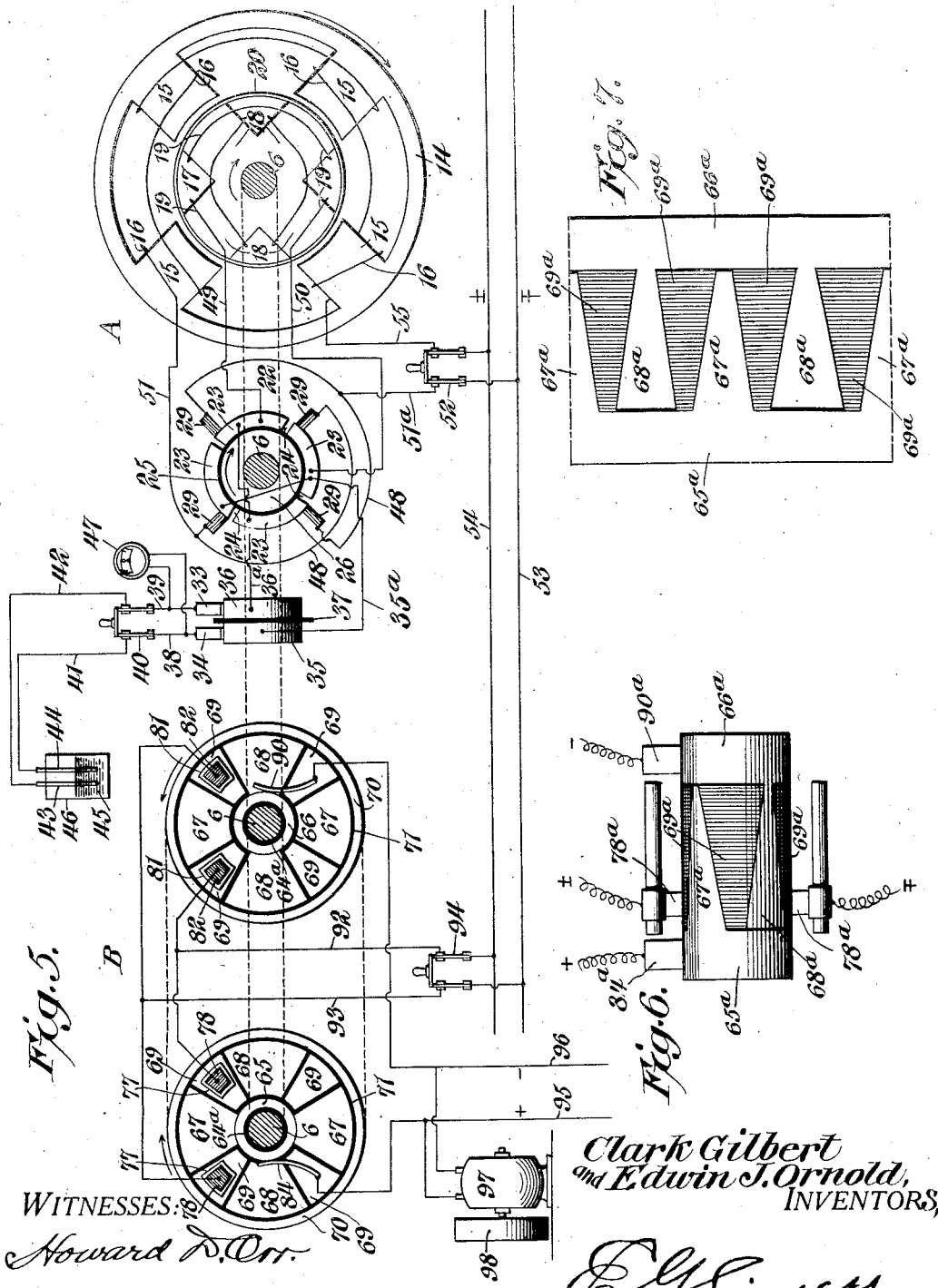

UNITED STATES PATENT OFFICE.

CLARK GILBERT, OF BRIDGEPORT, OHIO, AND EDWIN J. ORNOLD, OF WHEELING, WEST VIRGINIA, ASSIGNORS OF ONE-THIRD TO RANDOLPH STALNAKER, OF WHEELING, WEST VIRGINIA.

RECTIFIER FOR ALTERNATING ELECTRIC CURRENTS.

1,239,588.  Specification of Letters Patent.  Patented Sept. 11, 1917.

Application filed January 14, 1916. Serial No. 72,096.

*To all whom it may concern:*

Be it known that we, CLARK GILBERT and EDWIN J. ORNOLD, citizens of the United States, residing respectively, at Bridgeport and Wheeling, in the respective counties of Belmont and Ohio and respective States of Ohio and West Virginia, have invented a new and useful Rectifier for Alternating Electric Currents, of which the following is a specification.

This invention has reference to rectifiers for alternating electric currents, and its object is to provide a rectifying commutator and means for driving it, as well as a rectifying system whereby the voltage of the direct current produced is sensibly constant, varying only with the grosser variations of the source of alternating current and with even such grosser variations smoothed out to a material extent.

In accordance with the present invention there is provided a commutator having extended dead plates with brushes movable along the dead plates in a direction transverse to the direction of movement of the plates and also in the direction of movement of the plates, so that by the movement of the brushes transverse to the direction of movement of the plates the voltage of the direct current with respect to that of the alternating current may be varied and by movement of the brushes either forward or backward with relation to the direction of movement of the plates, there may be compensation for difference in phase relation between the current supplied to the means for driving the commutator and the current supplied to the commutator itself, should such difference be present.

In connection with the rectifying commutator, the invention contemplates the use of a set of contact brushes in multiple with the main brushes in order to avoid the formation of arcs between the segments and brushes. Furthermore, the system of the present invention contemplates electromechanical means connected across the direct current mains coming from the rectifying commutator so as to absorb the high peaks of electrical waves and give off current at the low peaks because of the inertia of the moving parts of the electromechanical means.

The invention also contemplates m for driving the rectifying commutator the form of a self-starting anti-hunting synchronous motor having means associated therewith for the production in one member of the motor of unidirectional currents at synchronous speed, said means including indicating means for showing the polarity of such unidirectional current.

Since the rectifier of the present invention is pecularily adapted for the charging of storage batteries and for use where the direction of flow of the direct current is of importance, the features named are of importance.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a side elevation of a rectifying unit embodying features of the present invention.

Fig. 2 is a longitudinal vertical section with some parts in elevation of the structure of Fig. 1.

Fig. 3 is a section on the line 3—3 of Fig. 2.

Fig. 4 is a section on the line 4—4 of Fig. 2.

Fig. 5 is a diagrammatic representation of the system of the present invention.

Fig. 6 is a plan view of a modified form of rectifying commutator showing it in drum type.

Fig. 7 is a displayed view of the commutator drum of Fig. 6.

The rectifying unit consists of a synchronous motor A of special construction and a rectifying commutator structure B so connected that the motor drives the commutator.

For compactness of structure there is provided a base 1 of suitable construction carrying the motor A near one end and the commutator structure B near the other end.

While the motor A is not confined to any particular mechanical construction, the showing of the drawings is that of a motor embodying features of the present invention which has been constructed and successfully operated. The motor is provided with a casing 2 of suitable shape carried by a pedestal 3 made fast to the base 1 as by a bolt 4. One side of the casing is formed with a journal bearing 5 for a shaft 6, while the other side of the casing is in the form of a removable face plate 7 made fast to the main portion of the casing by screws 8, or in any other suitable way. The parts so far described, so far as the motor is concerned, may be of any usual or suitable construction and may be changed and modified as may be found expedient.

The shaft 6 extends axially through the casing 2 and through and beyond the face or cover plate 7, and is supported by a journal bearing 9 carried by a standard 10 mounted on the base 1. In order to reduce friction the journal bearing 9 includes ball bearings 11 or any other suitable form of anti-friction devices. On that side of the journal bearing 9 remote from the motor casing 2 the shaft 6 is expanded into a flange or head 12 having diametrically opposite lugs 13 on the face of the head 12 remote from the motor. The purpose of the lugs 13 will appear hereinafter.

Within the casing 2 there is mounted a laminated ring 14 formed with pole pieces 15 extending toward the center of the ring and also in a circumferential direction. Mounted on the pole pieces 15 are coils 16 of suitable shape, gage of wire and number of turns, in accordance with the electric current to be employed.

Mounted on the shaft 6 within the motor structure is a rotor 17 having a laminated body with radial pole pieces 18 each carrying a coil 19 of a number of turns and gage of wire conforming to the current to be used. The coils 19 are held in place by bands 20 which may consist of wire wound about the rotor with interposed sheets 21 of insulating material, such as vulcanized fiber engaging the coils 19 preventing these coils from being dislodged by centrifugal force. The bands 20 are electrically connected to the rotor pole pieces and constitute closed circuits of lower resistance aiding in overcoming distorting forces which may be set up in the rotor.

Mounted on the shaft 6 is a commutator 22 having plates 23 cross connected and equal in number to the coils of the stator or rotor, each of which has the same number of coils or windings as the other. In the showing of the drawings the stator is provided with four pole pieces and four coils and the rotor has also four pole pieces and four coils. The commutator 22, therefore, has four plates 23, which latter are spaced apart at the adjacent ends by narrow spaces 24. In the structure shown the plates 23 are carried by an insulating support 25 in turn carried by a sleeve 26 of insulating material mounted on the shaft 6, this sleeve being extended along the shaft in a direction away from the rotor. The spaces 24 are in the nature of elongated recesses arranged diagonally of the commutator and forming channels through which air may circulate. Because of the diagonal disposition of these channels to the direction of rotation, air streams are caused to circulate through them and thereby aid in extinguishing any arcs which might possibly be otherwise established between the adjacent ends of the commutator plates or blocks.

Mounted on the face plate 7 is a ring 27 of insulating material surrounding the commutator 22 and held to the face plate 7 by a clamp plate 28, so that the ring may be rotated about its axis for purposes of adjustment, but will be held in adjusted positions by the friction of the ring 27 and clamp plate or ring 28 on the face plate 7. Of course, any other means whereby the ring may be rotatably adjusted may be used and it will be understood that the ring 27 is indicative of any suitable carrier for the purpose for which it is intended. Extending through the ring 27 are brushes 29 of suitable material, such as carbon urged against the commutator 22 by pressing springs 30. The particular form of brushes and the manner of mounting them is immaterial to the present invention, and hence any suitable type of brushes and mounting therefor may be used. In the showing of the drawings each brush 29 where engaging the commutator has a narrowed extension 31 a little wider than the slot or recess 24 between the commutator plates 23, so that the brushes may bridge the spaces between the plates for a small fractional part of the rotative movement of the commutator.

The ring 27 carries rods or pins 32 carrying brushes 33, 34, bearing upon respective rings 35, 36 mounted on the sleeve 26 and separated by a ring 37 of insulating material, thereby preventing any liability of engagement of the brushes 33 and 34 with each other. Connected to the brushes 33 and 34 are conductors 38, 39, respectively, leading to a switch 40 designed to connect these conductors to other conductors 41, 42, in turn connected to plates 43, 44 of iron and aluminum, respectively, dipping in a solution 45 of bicarbonate of sodium contained in a vessel 46. The plates 43 and 44 dipping in the solution 45 constitute a polarized resistance which may be replaced by other known forms of polarized resistance, the particular one described with reference to the drawings being but one of several polarized resistance suitable for the purpose of the present invention. Branched across the conductors 38 and 39 is a polarity indicator 47 of known form.

The stator coils 16 are connected in series and the rotor coils 19 are connected in series, both as indicated in Fig. 5. The segments 23 are cross connected as indicated in Fig. 5 and the brushes 29 are cross connected by conductors 48, while the respective pairs of segments 23 are connected by respective conductors 35ª and 36ª to the respective collecting rings 35 and 36, these various connections being indicated in Fig. 5.

One end of the series of coils 19 is connected by a conductor 49 to one cross connected pair of commutator plates 23, which pair of plates is connected by the conductor 36ª to the ring 36. The other end of the series of coils 19 is connected by a conductor 50 to the other cross connected pair of commutator segments 23, and this last-named pair of segments is connected by the conductor 35ª to the ring 35. One end of the series of stator coils 16 is connected by a conductor 51 to one cross connected pair of brushes 29, while the other cross connected pair of brushes is connected by a conductor 51ª through a switch 52 to an alternating current main 53, the other main 54 being connected by a conductor 55 to the other end of the series of coils 16.

On starting the motor the switch 40 is open and on closing the switch 52 to start the motor, the motor is then a commutating series and induction type of single phase motor, the stator and rotor coils being in series. The motor is under the conditions named a self starting motor, the switch 40 being open and will run near synchronous speed with the switch open, but may vary slightly from such speed.

When the motor reaches synchronous speed and is in the proper phase step, which will be shown by the indicator 47, the switch 40 is closed, whereupon the motor will run synchronously. Should the motor not be in proper phase step when the switch 40 is closed, the polarized resistance represented by the plates 43, 44 and solution 45 will short circuit the rotor, wherefore there being magnetic effect only in opposition to the rotor the motor will quickly stop. To start the motor again the switch 40 must be opened.

The polarized resistance being bridged across the commutator gaps absorbs the arc and forces all current through the rotor coils when the rotor is in proper phase step, thus producing an equal magnetic effect in all the pole tips, since all the current going through the stator coils must go through the rotor coils. Without the polarized resistance arcs form between the commutator bars due to the short circuiting thereof by the brushes. The amount of current producing the arcs would, therefore, be taken from the rotor coils, thus lowering the magnetic strength of the rotor pole tips and correspondingly lowering the efficiency of the motor, besides shortening the life of the commutator and the brushes.

The wire bands 20 commonly used to hold the rotor coils in place are electrically connected to the rotor pole tips and serve as short circuits, thus giving the rotor an induction effect in starting. When the motor reaches synchronous speed the short circuiting bands prevent the stator poles from demagnetizing the rotor poles, since the segments 23 act as a rectifier and allow only intermittent direct current to flow through the rotor coils 19 when the brushes are properly set in relation to the pole tips.

In the motor of the present invention where the same current going through the stator coils also goes through the rotor coils, they both vary simultaneously from zero to maximum with the zero point occurring when both rotor and stator poles are in line, as in Fig. 5. The maximum current flow is when the rotor pole tips are intermediate of the stator pole tips. The reversal of current takes place when the rotor and stator pole tips are in line. Care is taken to get the distance between the pole tips equal to the width of the pole tips.

In the particular arrangement shown in Fig. 5 the rotor will start clockwise, as indicated by the arrow. Any further movement short circuits the commutator bars 23 by the brushes 29. The back electromotive force produced by residual magnetism at the pole tips is mainly absorbed by the short circuited bands 20. When the bars 23 pass under the brushes the current begins to build up in the coils 16 and 19, being of equal strength because the coils are in series, until the maximum strength is reached, the rotor pole tips being then about midway between the stator pole tips and then decreases until the pole tips face one another. It is because of this condition that the motor persistently runs in synchronism.

Spaced from the journal bearing 9 on the side thereof remote from the motor A is another journal bearing 56 on a suitable standard 57 and inclosing anti-friction devices 58 supporting the corresponding end of the shaft 6, which is extended from the flange 12 sufficiently for the purpose.

Mounted on that portion of the shaft 6 between the standards 10 and 57 is a sleeve 59 having anti-friction rollers 60 between the shaft and sleeve, the rollers being suitably spaced by a spacing sleeve 61 or any other means may be provided for reducing friction between the sleeve 59 and shaft 6, since these parts may have limited rotative movements independent of each other, as will hereinafter appear. At one end the sleeve 59 is entered by a ring nut 62 threaded into the sleeve and serving to retain the anti-friction bearings 60. At the other end, which is the end toward the motor A, the sleeve 59 terminates in a radially extended flange 63 having diametrically opposite recesses 64 in the face toward the flange 12 for the purpose of receiving the lugs 13. The recesses 64 are made of somewhat greater circumferential extent than the lugs 13, so that there may be a small amount of rotative play between the sleeve 59 and the shaft 6.

Mounted on the sleeve 59 but separated therefrom by insulation 64$^a$, are two collector rings or sleeves 65, 66, respectively. The ring 65 is axially elongated in the particular showing of the drawings to provide a broad bearing surface, and at the end toward the ring 66 is formed with or has attached to it diametrically opposite segments 67, each in the particular showing of the drawings including an arc of several degrees.

The ring 66 is also axially elongated and at the end toward the ring 65 has formed on or carries diametrically opposite segments 68 of similar extent to the segments 67 and disposed on a diameter at right angles to the diameter in which the segments 67 are disposed. The segments 67 and 68 are arranged in the same plane perpendicular to the axis of rotation of the sleeve 59. Interposed between the adjacent edges of the segments 67 and 68, which may be termed live segments, are other segments 69 of substantially the same radial extent as and of somewhat less circumferential extent than the segments 67 and 68, which latter may be all of substantially equal size. The segments 69 are all in the same plane with the segments 67 and 68 but are insulated therefrom at the adjacent edges and are also insulated from the rings 65 and 66, wherefore the segments 69 may be termed dead segments.

Furthermore, all the segments are surrounded by a retaining ring 70 between which and the segments insulation 71 is interposed.

Mounted in the journal bearing 56 is a rock arm 72 constituting a brush holder capable of being rocked about the axis of the shaft 6. Carried by the arm 72 through the intermediary of a rod 73 or other suitable means, are divergent arms 74 each carrying a block 75 slidable lengthwise of the respective arm 74 and provided with a set screw 76, or other means, whereby the block may be temporarily secured at any suitable point along the respective arm 74. Each block 75 has secured thereto a brush holder 77 of suitable shape to carry a collecting brush 78, usually in the form of a carbon block and the brush is urged in one direction by a spring 79. Each block 75 has a projecting portion 80 in straddling relation to the segments carried by the sleeve 59 and each projection 80 is formed with a brush holder 81, a collecting brush 82 and a spring 83. The arrangement is such that brushes 78 and 82 bear upon the segments 67, 68 and 69 from opposite faces thereof, whereby ample bearing surface of the brushes upon the segments is provided.

There is a pair of brushes carried by each arm 74 and these brushes are in about 90° relation to the axis of rotation of the series of segments 67, 68 and 69 constituting the rectifying commutator of the machine.

Bearing upon the collector ring 65 is a pair of collecting brushes 84 mounted in holders 85 carried by an arm 86 mounted on a rod 87, which may be of insulating material or from which the holders are suitably insulated, and the rod 87 is mounted on a suitable part of the machine, as, for instance, in brackets 88 made fast to the base portions of the standards 10 and 57. The brushes 84 are urged toward the ring 65 by springs 89. Another pair of brushes 90 bear upon the ring 66 and are provided with a holder 91 mounted on the rod 87. Two brushes are employed to give the broad surface contact and it will be understood that other arrangements may be used for the same purpose.

One set of brushes 78 and 82 is connected to a conductor 92 and the other set of brushes is connected to a conductor 93, and these conductors lead to a switch 94 by means of which they may be coupled up to the alternating current mains 53 and 54.

The brushes bearing upon the collecting ring 65 are connected to one direct current lead 95 and the brushes bearing upon the other collecting ring 66 are connected to the other direct current lead 96. Branched between the direct current leads 95 and 96 is a shunt wound direct current motor 97 carrying a fly-wheel accumulator 98.

Instead of the arrangement described with relation to the rectifying commutator B, which in the drawings in Figs. 1 to 5 is indicated as of disk type, it may be of cylindrical type indicated in Figs. 6 and 7. In such cylindrical form there are cylindrical collecting rings 65$^a$, 66$^a$ with the ring 65$^a$ having circumferentially spaced tapering continuations 67$^a$ corresponding to the segments 67, while the ring 66$^a$ has expanding continuations 68$^a$ corresponding to the segments 68 of the other figures. The extensions 67ª and 68ª are located between the rings 65ª and 66ª in interspersed relation and are separated by correspondingly tapering or expanding insulation segments 69ª having the same function as the insulated segment 69 of the structure of Figs. 1 to 5. Brushes 84ª and 90ª bear upon rings 65ª, 66ª and other brushes 78ª bear upon the segments or continuations 67ª and 68ª and are assumed to be adjustable lengthwise thereof, as well as circumferentially thereof in the same manner as in the other figures of drawing.

There is also provided a contact brush 99 carried by an arm 100 mounted upon the carrier 72, and this brush is arranged in multiple with and close to the main rectifier brushes on the alternating side thereof, whereby liability of an arc following the main brushes is avoided.

The rectifier brushes engaging the rectifier commutator segments have their sides radial to the axis of rotation of the rectifier, or parallel with the corresponding sides of the rectifier commutator plates, so that they make and break circuit therewith substantially along the entire length of the respective brushes.

Assuming that the motor A is running in the proper direction at synchronous speed, the rectifier commutator is constructed to rotate at the same speed because of the connection or coupling due to the lugs 13 and recesses 64, except that there may be a slight displacement circumferentially of the motor and rectifying commutator due to the loose fit of the lugs 13 in the recesses 64. The loose coupling thus provided permits any lag in the rotor of the motor to be taken up by the heavy moving parts of the rectifying commutator and any lead in the rotor to be retarded in like manner. The rectifying commutator may therefore be considered as rotating synchronously with the motor and the latter as rotating synchronously with the cycles of the alternating current as modified by the number of poles of the motor, the segments of the rectifying commutator being the same as the number of poles of the motor.

When the parts are all properly adjusted, the direct current delivered to the mains 95 and 96, due to the rectification of the alternating current fed to the rectifying commutator, is sensibly constant, and is particularly adapted for the charging of storage batteries and for other purposes where such a current is demanded.

The adjustment of the main brushes of the rectifying commutator whereby the engagement of the brushes with the rectifying commutator segments may be made to lead or lag, permits adjustment for differences in phase relation should such relation occur for any reason. The radial adjustment of the collecting brushes of the rectifying commutator permits variations in voltage in the direct current. For instance, the contact brushes may be made to break contact with the live segments at an earlier period and make contact at a later period, which will result in reducing the voltage, while the reverse will be true in an adjustment of the brushes in the opposite direction radial to that first considered. In the radial or disk like commutator structure the nearer the brushes are to the periphery of the disk the lower the voltage. In the cylindrical form of commutator the same result is brought about in the particular showing of Figs. 5 and 6 by shifting the brushes 78ª toward the right hand end of the cylindrical rectifying commutator.

In the synchronous motor structure the diagonally arranged slots or grooves 24 between the adjacent ends of the commutator plates 23 contribute materially to avoiding the establishment of arcs between the plates 23 because of the air currents directed through these slots or grooves by the rotation of the motor commutator, thus blowing out any arc which may be formed.

Such irregularities as may occur in the uniformity of the direct current are in a large part taken care of by the fly wheel accumulator represented by the motor 97. This motor tends to flatten out any high peaks by its resistance to change any speed and to fill in any low peaks by acting as a generator and supplying current to the direct current mains.

Provision is made for large surface of contact and large carrying capacity in the rectifying commutator, so that it may be capable of rectifying large currents even though the rectifier in its mechanical construction be of relatively small size.

What is claimed is:—

1. A rectifier for alternating electric currents comprising a series wound synchronous motor, a rotatable series of contact segments connected to the motor for actuation thereby, dead segments interposed between and separating the first-named segments, and contact brushes on the alternating current side in position to engage the segments with the brushes contacting with the dead segments through the zero portions of the alternating current waves.

2. A rectifying structure for alternating electric currents, comprising a synchronous series wound motor provided with a commutator and with a polarized resistance bridged across the commutator of the motor, and a rotatable rectifier connected to and driven by the motor.

3. A rectifying structure for alternating electric currents, comprising a synchronous self-starting alternating current motor, a polarized resistance, and means for bridging it across the commutator of the motor, a rotatable rectifier, and lost motion connections between the motor and rectifier.

4. A rectifying system for alternating electric currents comprising an alternating current self-starting synchronous motor, a rotatable rectifier for the alternating currents connected to the motor for actuation thereby, and a shunt wound direct current motor with a fly wheel on its armature shaft, said motor being bridged across the direct current leads.

5. An alternating current motor having a stator and rotor each provided with the same number of coils and poles with the coils connected in series, a cross connected commutator for the rotor having the same number of segments as rotor coils, cross connected brushes for the commutator with the stator and rotor coils connected in series through the commutator and brushes, and a polarized resistance provided with connections and a switch for branching said resistance across the cross connected commutator segments.

6. An alternating current motor having a stator and rotor each provided with the same number of coils and poles with the coils connected in series, a cross connected commutator for the rotor having the same number of segments as rotor coils, cross connected brushes for the commutator with the stator and rotor coils connected in series through the commutator and brushes, and a polarized resistance provided with connections and a switch for branching said resistance across the cross connected commutator segments, the polarized resistance connections also including a polarity indicator branched thereacross on the commutator side of the switch.

7. An alternating current synchronous motor comprising a stator and rotor each with the same number of coils and pole pieces as the other and with the coils of each connected in series, the rotor having the pole pieces electrically connected by short circuits of low resistance, a cross connected commutator for the rotor having as many segments as rotor coils, cross connected brushes for the commutator equal in number to the commutator segments, and a polarized resistance having means for including it in shunt relation to the commutator segments.

8. An alternating current synchronous motor comprising a stator and rotor each with the same number of coils and pole pieces as the other and with the coils of each connected in series, the rotor having the pole pieces electrically connected by short circuits of low resistance, a cross connected commutator for the rotor having as many segments as rotor coils, cross connected brushes for the commutator equal in number to the commutator segments, and a polarized resistance having means for including it in shunt relation to the commutator segments, said commutator segments having their adjacent ends spaced apart and arranged at an angle to the direction of rotation.

9. An alternating current synchronous motor comprising a stator and rotor each with the same number of coils and pole pieces as the other and with the coils of each connected in series, the rotor having the pole pieces electrically connected by short circuits of low resistance, a cross connected commutator for the rotor having as many segments as rotor coils, cross connected brushes for the commutator equal in number to the commutator segments, and a polarized resistance having means for including it in shunt relation to the commutator segments, said commutator segments having their adjacent ends spaced apart and arranged at an angle to the direction of rotation, and the motor being also provided with a polarity indicator branched across the commutator segment connections.

In testimony, that we claim the foregoing as our own, we have hereto affixed our signatures in the presence of two witnesses.

CLARK GILBERT.
EDWIN J. ORNOLD.

Witnesses:
ADDIE A. MENDENHALL,
CHAS. J. SCHUCK.